(No Model.)

L. RODENHAUSEN.
VEHICLE SPRING.

No. 268,827. Patented Dec. 12, 1882.

Attests:
L. J. Matos
R. S. Chiesa

Inventor:
Leonhard Rodenhausen
By his atty.

UNITED STATES PATENT OFFICE.

LEONHARD RODENHAUSEN, OF PHILADELPHIA, PENNSYLVANIA.

VEHICLE-SPRING.

SPECIFICATION forming part of Letters Patent No. 268,827, dated December 12, 1882.

Application filed June 28, 1882. (No model.)

*To all whom it may concern:*

Be it known that I, LEONHARD RODENHAUSEN, of the city and county of Philadelphia, and State of Pennsylvania, have invented an Improvement in Vehicle-Springs, of which the following is a specification.

My invention has reference to vehicle-springs; and it consists in certain improvements upon the invention patented to me December 28, 1880, No. 236,090, but more specifically in guiding the end of a yielding arm which rests against the spiral spring by means of a bolt or rod or guide carried by the body or frame of the said vehicle; further, in providing the vehicle with coil-springs and elliptic springs to relieve the said elliptic springs with heavy loads; and in details of construction, all of which are fully set forth in the following specification, and shown in the accompanying drawings, which form part thereof.

The object of this invention is to provide a vehicle with a simple, cheap, and easy-riding spring, and enable the coil-springs to support the load when the elliptical springs are overloaded.

Figure 1:
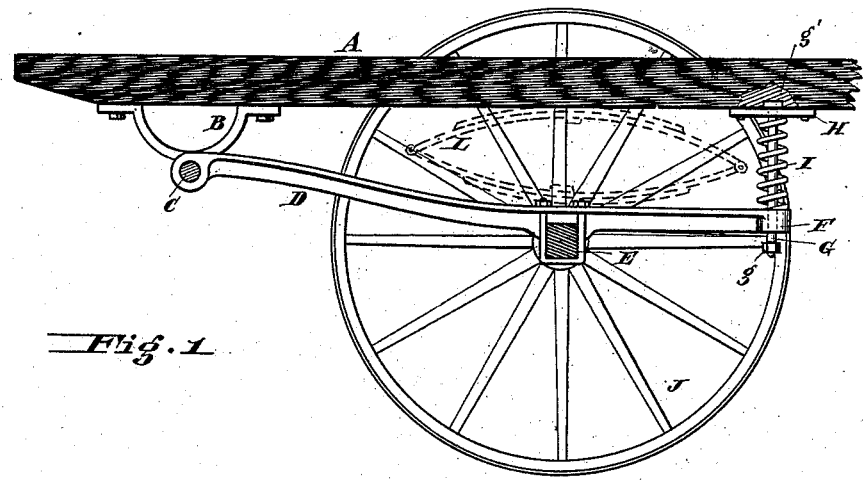
Figure 2:
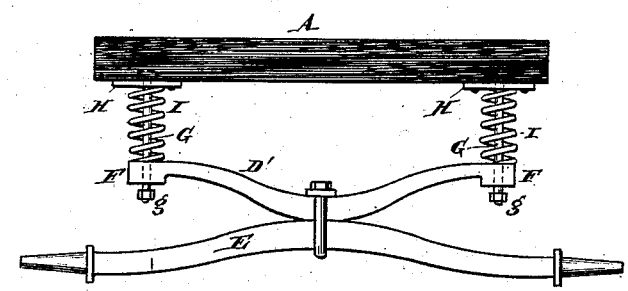
Figures 3, 4:
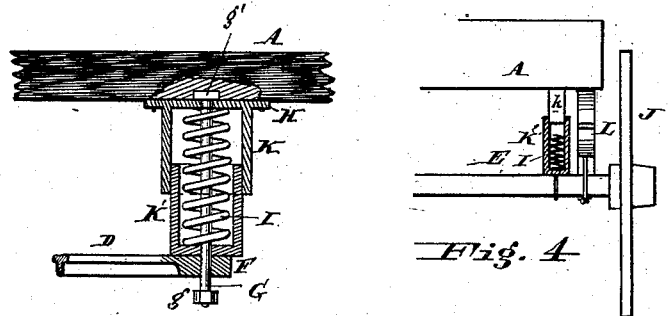

In the drawings, Figure 1 is a side elevation of a portion of a vehicle with one wheel removed, showing my improvement. Fig. 2 is a rear view of a modification of same. Fig. 3 is a sectional elevation of the coil-spring provided with a telescopic guide and dust-cylinders; and Fig. 4 is a rear view or elevation of a portion of a wagon, showing the coil-spring supported upon the axle of the wheel and arranged to support the body after the elliptical spring has been considerably compressed.

A is the body of the vehicle or frame thereof. To this frame is secured the stay or ear B, to which is pivoted or hinged at C the end of the yielding arm D, which is secured to the axle E, carrying the wheels J.

L is the usual elliptical spring, arranged between the body of the wagon and axle.

A bolt or rod, G, provided with a head, *g'*, is held to the frame A by a plate, H, and projects down and through a hole in the hub F on end of arm D.

The end of bolt G may have a nut or pin, *g*, to prevent its being drawn through the hole in the free end of the arm D accidentally.

Encircling the guide-pin G, and resting between plates H or frame A and the end of arm D, is the coil-spring I. The spring I may rest upon the axle E, if desired, as shown in Fig. 4.

The arm D may be made rigid or adapted to springing action within itself. As the load increases the spring I is compressed and the guide pin or bolt G slides down through arm D.

In place of having the arm arranged as shown in Fig. 1, it may be as shown in Fig. 2, in which the springs I rest upon each end of a rigid or spring bar, D', which is secured in the middle to axle E. I do not limit myself to any particular arrangement, as the bars or arms may be of any desired construction without departing from my improvement.

If desired, the plate H may be provided with a downwardly-projecting cylinder, K, open on the bottom, and the end of arm D with an upwardly-projecting cylinder, K', of smaller or larger diameter, which slides into or over cylinder K, forming a guide and at the same time a protector or dust-cap.

Where weak elliptical springs are now upon wagons I may place a coil spring or springs directly upon the axle E, protecting them by tubular cases K', as shown in Figs. 3 and 4; and plungers or lugs *k* may project down into said cases. After the elliptical springs have been compressed the coil-springs I then come into play and support or help to support the load.

In some wagons now in use rods somewhat similar to rods G are used, and are guided by holes in or through plates secured to the axles. When these are on the wagon the coil-springs may be set around them.

I am aware of the patents to Clark, No. 252,187, and Hagamann, No. 217,094, and claim nothing therein shown or claimed.

Having now described my invention, what I claim as new, and desire to secure by Letters Patent, is—

1. A vehicle body or frame provided with a downwardly-projecting guide pin or bolt carrying a spiral spring, in combination with a spring or yielding arm pivoted to the vehicle-body at one end and secured to the axle, and provided on its free end with a hole, through which the bolt slides, the said coil-spring being arranged between the said arm and vehicle body or frame, and means to protect said coil-springs from dirt and injury, substantially as and for the purpose specified.

2. In combination with the vehicle-body and its downwardly-projecting bolt and spiral or coil spring, a yielding arm hinged at one end to the body, secured at or about the middle to the axle, and having its free end provided with a hole, through which the said bolt freely moves, and an elliptic spring arranged between the said body and axle, substantially as shown.

3. The combination of the vehicle body or frame A, bolt G, spring I, telescopic guide and dust-cylinders K K′, and a yielding or spring arm secured to the axle, substantially as and for the purpose specified.

In testimony of which invention I hereunto set my hand.

LEONHARD RODENHAUSEN.

Witnesses:
R. M. HUNTER,
R. S. CHILD, Jr.